United States Patent [19]

Vivier

[11] Patent Number: 5,530,588
[45] Date of Patent: Jun. 25, 1996

[54] REARVIEW DEVICE

[76] Inventor: Mark C. L. Vivier, E7 Strathcona, London Road, Sea Point, Cape Town, Cape Province, South Africa

[21] Appl. No.: 941,564

[22] Filed: Sep. 8, 1992

[51] Int. Cl.$^6$ .............................. G02B 5/08; G02B 7/182
[52] U.S. Cl. .......................... 359/517; 359/868; 359/871; 359/879
[58] Field of Search ..................... 359/516, 517, 359/518, 519, 868, 871, 872, 879, 881; 248/488; 2/DIG. 8

[56] References Cited

U.S. PATENT DOCUMENTS

| D. 236,458 | 8/1975 | Sargis . | |
|---|---|---|---|
| 1,139,560 | 5/1915 | Mosher . | |
| 1,499,175 | 6/1924 | Holquist . | |
| 1,535,105 | 4/1925 | Cota | 359/517 |
| 1,592,534 | 7/1926 | Mitchel | 359/517 |
| 2,265,094 | 12/1941 | Wolfe . | |
| 3,717,403 | 2/1973 | Messier . | |
| 4,863,239 | 9/1989 | Malone . | |

FOREIGN PATENT DOCUMENTS

| 0534190 | 12/1956 | Canada | 359/517 |
|---|---|---|---|
| 0916960 | 12/1972 | Canada | 359/879 |
| 0028450 | 8/1913 | United Kingdom | 359/519 |
| 0345766 | 4/1931 | United Kingdom | 359/879 |

*Primary Examiner*—Ricky D. Shafer
*Attorney, Agent, or Firm*—Killworth, Gottman, Hagan & Schaeff

[57] ABSTRACT

A rearview device comprises a convex dome which has a reflective outer surface. The dome is hollow and a closure plate is snap-fitted into the open side of the dome. The plate has apertures in it through which a strap can be passed to enable the dome to be fitted to the wrist or arm. The space between the dome and the plate serves as a storage compartment. The dome, because it reflects search radar etc, can be used as a homing device to enable lost persons to be located.

8 Claims, 1 Drawing Sheet

REARVIEW DEVICE

FIELD OF INVENTION

This invention relates to rearview devices.

BACKGROUND TO THE INVENTION

Many sportsmen, for example divers and cyclists, and drivers of vehicles such as snowmobiles, find it desirable to know what is happening behind them but cannot readily look over their shoulder as this means taking their eyes off events in front of them. In a fast moving sports such as cycling this can be extremely dangerous.

Proposals for mirrors that mount on the hand or wrist have been made, these mirrors being configured and positioned to provide a rear view. The major problem with the known devices is that they either provide too limited a field of vision or are bulky and awkward to use. In some instances their water drag or wind resistance mitigates against their use.

OBJECTS OF THE INVENTION

The main object of the invention is to provide a rearview device which offers little drag but which provides a wide field of rear vision.

A further object of the present invention is to provide a rearview device which additionally provides storage space.

Yet another object of the present invention is to provide a rearview device which can be fitted to wearing apparel without cutting or otherwise altering the apparel.

A still further object of the present invention is to provide a rearview device which can act as a sunlight reflector, focusing the light, and hence the heat of the sun, so that inflammable material can be ignited.

Another object of the present invention is to provide a rearview device which can serve as a reflector of, for example, radar waves and which thus constitutes a search and rescue aid.

BRIEF SUMMARY OF THE INVENTION

According to the present invention there is provided a rearview device comprising a hollow dome having a reflective outer face, a removable plate fitted into the open side of said dome, and apertures in said plate through which a strap for fastening the rearview mirror to the arm or hand of the user can be passed.

Said outer face of the dome is preferably part-spherical in form.

Said plate can be snap-fitted into said open side of the dome. In the preferred form said dome has an internal circumferentially extending rim around said open side, said plate being flexible so that it can be fitted into said open side between said rim and the adjacent part of said dome. Said plate preferably has apertures at diametrically opposed locations thereof. Said apertures can be constituted by two diametrically opposed notches in the circular periphery of said plate.

In the preferred form said dome is of synthetic plastics material which has been coated externally with a layer of reflective material, e.g. chrome. It could, however, be of metal which has a naturally reflective surface or a polished surface.

Whilst the primary function of the device is as a rearview mirror, it can also be used as a reflector for radar and other electromagnetic radiation. When suitably worn on clothing or fixed to an exposed surface, the device can then be used to locate a person lost at sea, in snow or in difficult terrain especially when visibility is poor in fog and/or night.

The space within the dome can serve as a storage compartment and receive a "space blanket" or a small emergency kit. It can also receive car keys and other personal items or an inflatable balloon which can be used to raise objects from below water to the surface.

BRIEF DESCRIPTION OF DRAWINGS

For a better understanding of the present invention, and to show how the same may be carried into effect, reference will now be made, by way of example, to the accompanying drawings in which.

DETAILED DESCRIPTION OF DRAWINGS

Figure 1:
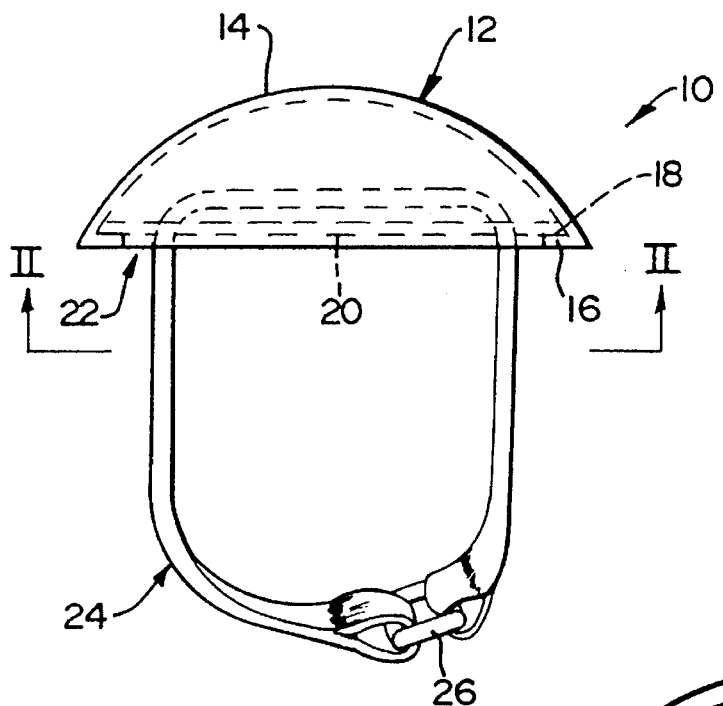
FIG. 1 is a side elevation of a rearview mirror in accordance with the present invention.
Figure 2:
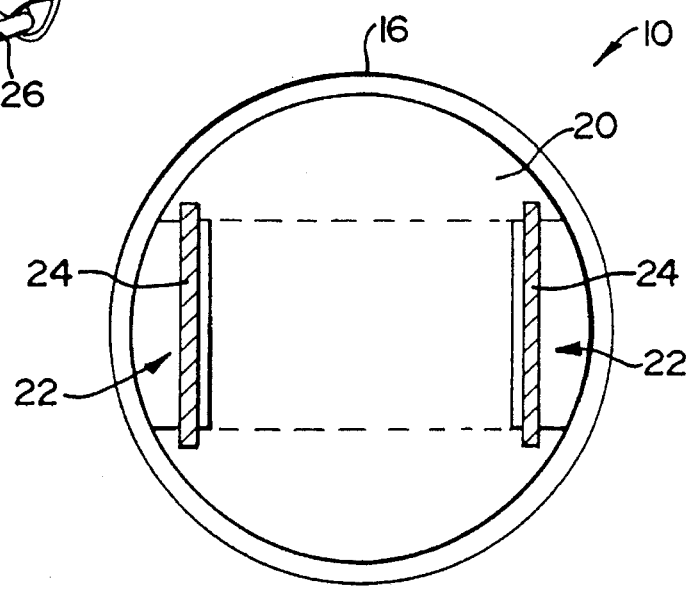
FIG. 2 is a section on the line II of FIG. 1.
Figure 3:
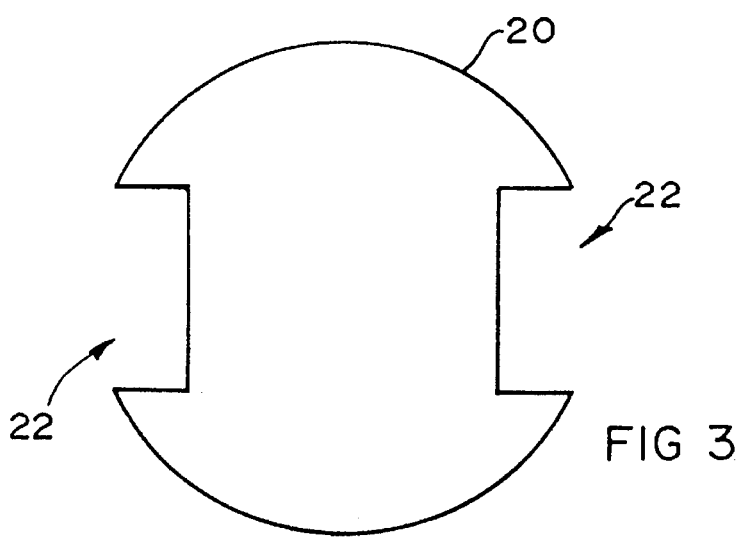
FIG. 3 is an underneath plan view of a closure plate.

The rearview mirror 10 illustrated comprises a hollow dome 12 which is part spherical in form. The dome can be hemispherical but is preferably less than hemispherical in extent. The dome 12 is preferably of moulded synthetic plastics material which is externally coated with a light reflective material which reflects electromagnetic radiation such as visible light, invisible light (ultraviolet and infrared) laser light and microwaves. Chromium plating the outer face 14 of the dome 12 is the preferred method of obtaining the requisite reflective surface.

Around the periphery of the opening in the dome 12 there is a rim 16. The rim 16 provides a circular support surface designated 18.

Fitted into the dome 12, and trapped between the surface 18 and the adjacent part of the inner face of the dome 12, is a circular closure plate 20. The closure plate 20 has to be deformed before it can be inserted into, or removed from, the open side of the dome 12. The plate 20 is preferably of synthetic plastics material. If desired a circumferentially extending ridge can be provided adjacent the surface 18, the plate 20 being trapped between this ridge and the surface 18 of the rim 16.

The plate 20 has two apertures therein, the apertures being in the form of notches 22 at diametrically opposed locations on the periphery of the plate 20.

A strap 24 passes through one of the notches 22, between the plate 20 and the dome 12 and emerges through the other notch 22. The strap 24 includes a buckle 26 at one end thereof. Two pieces of the material which is available commercially under the name "Velcro" are sewn to the part of the strap which is on the opposite side of the dome 12 to the buckle 26. The two pieces of material (one of which has loops and the other of which has hooks) are on the same side of the strap as one another. When the free end of the strap (that end which is furthest from the buckle) is passed through the buckle and turned back on itself, shown in FIG. 1, the loops and hooks inter-engage and hold the strap in the form of a loop.

The rearview mirror can be strapped onto the hand or onto the arm below the shoulder. It will most usually be worn on the hand or on the wrist, but could be worn anywhere, or attached to any surface, when being used for location purposes.

To provide for ready attachment to an article of clothing or other object, a piece of "Velcro" can be secured to the plate 20 e.g. by adhesive and another piece can be stitched or otherwise secured to said article of clothing or other object.

It will be understood that the part spherical outer face 14 of the dome is not obstructed by a rim or any other part of the rearview mirror to which the dome is secured. Thus an uninterrupted rear view which covers a wide angle behind the wearer can be provided without the necessity of the dome 12 being of excessive height. This configuration also provides a large, wide angle surface which is advantageous when the device is being used for location purposes.

By cutting two parallel slits in a glove or the like, and sliding the plate 20 under the strip of the glove which lies between the slits, it is possible to fix the device directly to the glove. The apertures 22 lie under said strip of the glove.

It is also possible to secure the mirror to an article of fabric by detaching the plate 20 from the dome 12 and removing the strap 24. The dome is then placed with its open side against one face of the fabric and the plate placed against the other face. The two are then pasted together so that the plate snaps into the dome with the fabric trapped between them.

The rearview mirror disclosed is particularly intended for divers but can be worn by windsurfers, cyclists and other sportsmen who need to see behind them without the necessity of turning around to look over their shoulder.

It is also possible for the plate 20 to be arcuate and have a smaller radius than the dome 12 which in this form is more than hemispherical. The plate 20 thus presents a groove and can be fitted directly onto the arm of the user.

The outer surface of the device is preferably part spherical but can have a composite part-spherical/conic-section outer shape if it is desired to achieve a special visual effect. The conic-section is preferably a parabola but could be a hyperbola. The inner surface of the dome can be shaped to provide a parabolic or hyperbolic reflector which focuses sunlight, and hence heat, onto a small quantity of inflammable material. The dome can thus be used to start a fire. The inner surface can be of polished metal, naturally reflective metal or chrome coated plastics. To use the dome for this purpose it is necessary to detach the plate 20 from the dome 12, point the open side of the dome towards the sun, and position the inflammable material in the region where the inner face of the dome focuses the reflected sunlight.

The space bounded by the dome 12 and plate 20 provides a small storage space for emergency items such as a thermal blanket (often referred to as a "space" blanket). It can also contain an electrical circuit which includes a transponder or other signalling device usable to track the person wearing the rearview device.

I claim:

1. A rearview device comprising a hollow dome having an inner face and a reflective outer face and an opening in the dome to form an open side of the dome, a removable plate snap-fitted into the open side of said dome, and apertures in said plate through which a strap for fastening the rearview device to a user's arm or hand can be passed, wherein said dome has a rim extending circumferentially around said opening, said rim having a support surface which faces said inner face of said dome, said plate being flexible so that it can be inserted into said dome through said opening to a position in which it is located inwardly of said rim and in contact with said support surface of said rim.

2. A device according to claim 1, wherein said apertures in the plate are two in number and are at diametrically opposed locations.

3. A device according to claim 2, wherein said plate has a circular periphery and said apertures are constituted by two diametrically opposed notches in said circular periphery of said plate.

4. A device according to claim 1, wherein said dome is of synthetic plastics material which is coated externally with a layer of reflective material.

5. A device according to claim 1, wherein said dome is of metal which has a naturally reflective surface or a polished surface.

6. A device according to claim 1 wherein the inner face of the dome is reflective and can be configured to focus sun light upon removal of said plate from said dome by pointing the open side of said dome toward the sun.

7. A device according to claim 1 wherein the outer face of the dome is of a composite part-spherical and part-parabolic shape, a first part of the outer face of the dome being part-spherical and a second part of the outer face of the dome being part parabolic.

8. A rearview device comprising a hollow dome having an inner face and a reflective outer face, an opening in the dome to form an open side of the dome, a removable plate fitted into the open side of said dome, a rim extending circumferentially around said opening, said rim having a support surface which faces said inner face of dome, said plate being flexible so that it can be inserted into said dome through said opening to a position in which it is located inwardly of said rim and in contact with said support surface of said rim.

* * * * *